(12) United States Patent
Buchtel

(10) Patent No.: US 8,091,581 B2
(45) Date of Patent: Jan. 10, 2012

(54) FLUID LEVEL CONTROL TOGGLE VALVE DEVICE AND METHOD

(76) Inventor: Michael E. Buchtel, Costa Mesa, CA (US)

( * ) Notice: Subject to any disclaimer, the term of this patent is extended or adjusted under 35 U.S.C. 154(b) by 541 days.

(21) Appl. No.: 11/927,142

(22) Filed: Oct. 29, 2007

(65) Prior Publication Data

US 2009/0151796 A1 Jun. 18, 2009

(51) Int. Cl.
*F16K 31/18* (2006.01)
(52) U.S. Cl. .............................. 137/448; 137/434; 4/508
(58) Field of Classification Search .................. 137/434, 137/448, 521, 527.6, 586; 251/228, 298, 251/339, 356, 357; 116/273, 264; 4/508; 73/317, 322.5
See application file for complete search history.

(56) References Cited

U.S. PATENT DOCUMENTS

| | | | | | |
|---|---|---|---|---|---|
| 448,262 | A | * | 3/1891 | Runnels | 137/448 |
| 1,266,324 | A | * | 5/1918 | Schacht | 251/357 |
| 2,149,584 | A | * | 3/1939 | Davis | 251/342 |
| 2,375,806 | A | * | 5/1945 | Mck. Martin | 137/448 |
| 2,559,046 | A | * | 7/1951 | Peters et al. | 137/448 |
| 2,653,788 | A | * | 9/1953 | Svabek, Jr. | 251/356 |
| 2,654,561 | A | * | 10/1953 | Trefil | 251/356 |
| 2,684,077 | A | * | 7/1954 | Shaffer | 137/433 |
| 2,804,344 | A | * | 8/1957 | Price | 239/602 |
| 2,804,880 | A | * | 9/1957 | Rasmusson | 137/448 |
| 3,095,896 | A | * | 7/1963 | Ross | 137/448 |
| 3,181,558 | A | * | 5/1965 | Straub | 137/438 |
| 3,342,207 | A | * | 9/1967 | Ross | 137/448 |
| 3,837,015 | A | * | 9/1974 | Whitaker | 4/508 |
| 3,874,344 | A | * | 4/1975 | Smith | 119/78 |
| 4,080,925 | A | * | 3/1978 | Moore | 116/200 |
| 4,254,794 | A | * | 3/1981 | Smith | 137/448 |
| 4,342,125 | A | * | 8/1982 | Hodge | 4/508 |
| 4,592,098 | A | * | 6/1986 | Magnes | 4/508 |
| 4,655,243 | A | * | 4/1987 | Keller | 137/403 |
| 4,750,515 | A | * | 6/1988 | Fukushima et al. | 137/448 |
| 4,796,650 | A | * | 1/1989 | Hwang | 137/448 |
| 4,853,986 | A | * | 8/1989 | Allen | 4/508 |
| 5,203,038 | A | * | 4/1993 | Gibbs | 4/508 |
| 5,419,359 | A | * | 5/1995 | Kor | 137/448 |
| 5,475,879 | A | * | 12/1995 | Miller | 4/508 |
| 5,655,232 | A | * | 8/1997 | Buckwalter | 4/508 |
| 5,836,022 | A | * | 11/1998 | Busenga | 4/508 |
| 6,826,787 | B2 | * | 12/2004 | Gregory | 4/508 |
| 6,966,334 | B2 | * | 11/2005 | Bolster | 137/434 |
| 7,520,296 | B2 | * | 4/2009 | Scribner et al. | 137/424 |
| 2009/0260149 | A1 | * | 10/2009 | Booth | 4/508 |

* cited by examiner

*Primary Examiner* — John Rivell
*Assistant Examiner* — Craig Price

(57) ABSTRACT

A water level control device has connected tubular housings, one serving as a support for a hose connection and the other serving to support a valve housing assembly for operation of a toggle valve within the valve housing. An airtight float serves to raise the one extreme of a float rod when buoyed by sufficient water level admitted through apertures in the valve housing. The other extreme of the float rod is attached to a rod holder to hold the float rod. The rod holder passes through an outlet apertured valve seat wherein a valve washer attached to the rod holder within the toggle valve cavity is urged against the outlet valve seat by water pressure from a water hose.

13 Claims, 3 Drawing Sheets

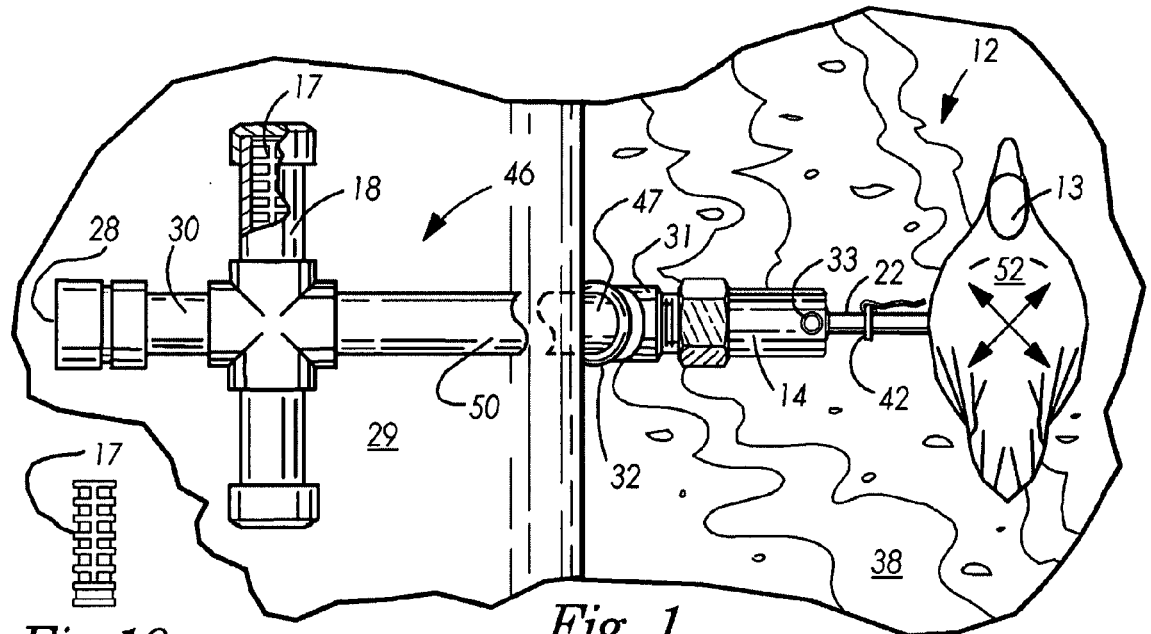
Fig 10    Fig. 1
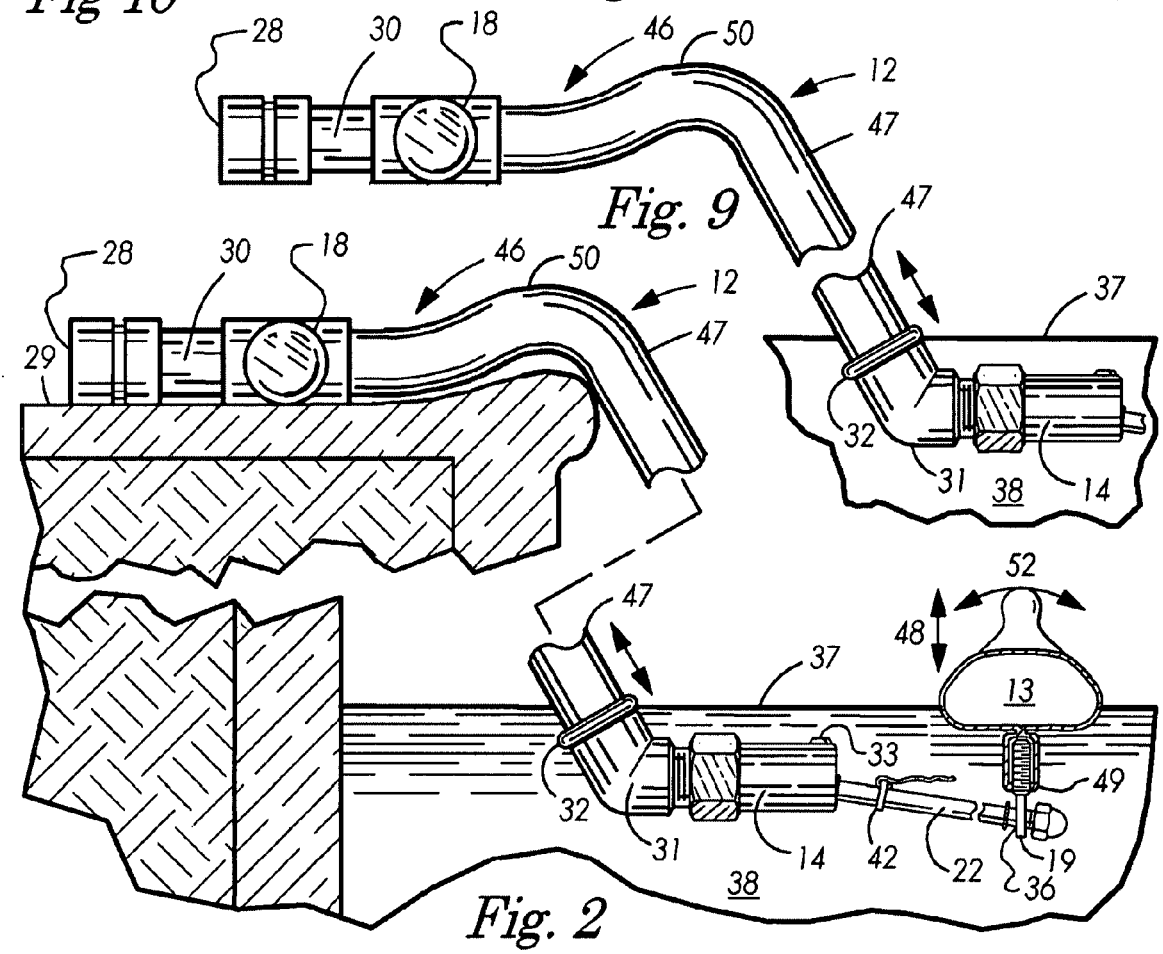
Fig. 9
Fig. 2

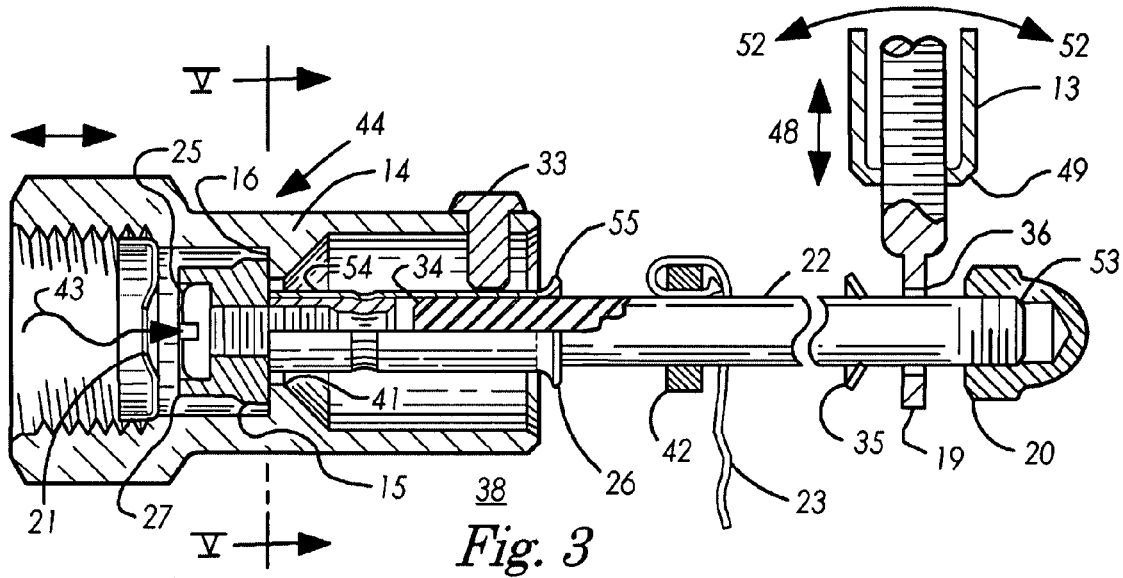

FLUID LEVEL CONTROL TOGGLE VALVE DEVICE AND METHOD

BACKGROUND OF INVENTION

1. Field of Invention

The present invention relates generally to fluid level control, and more particularly to maintaining a desired water level in a swimming pool.

2. Background Art

Swimming pools lose water everyday by evaporation from the sun regardless of the size of the pool. Pools can lose as much as one-quarter inch of water into the atmosphere on a typical day. Water loss in the pool as little a one inch typically drops the water level in the pool below that necessary for the proper use of the skimmer and circulating pump. If the water level drops below the skimmer and causes the pump to run dry, serious pump motor damage can occur. When sufficient air is drawn into the skimmer circulation system, the pump looses its prime, the impeller starts cavitation-pitting, or the pump motor over heats causing the pump motor burn-out and destruction of the pump seals. It is therefore important to be able to maintain the water level above the skimmer.

Since pool pumps are closed systems, it is possible to let the circulating pump draw (suck) make-up water already in the pool only from the bottom drain of the pool in order to temporally maintain water circulation. However, to do so, the skimmer will not collect floating debris blown into the pool. Instead, much of the debris that sinks to the bottom will be sucked up the drain and into pump collection basket. The pump basket being much smaller than the skimmer basket will eventually clog. As a result, the pump and pump motor starving for water acts as if the skimmer were starving for water. Thus, relying on the drain to do the work of the skimmer means more debris on the pool bottom and more frequent pump basket clogs. Cleaning the pool bottom and the pump basket are difficult tasks. Swimming pool owners must constantly check pool water levels, turn on the hose to fill the pool and then worry about turning the hose off before the pool overfills. Overfilling the pool can be more costly than under filling. If the water seeps under the pool deck and saturates the sub-soil, unsightly cracks or uneven deck tilting can occur. Pool owners who are away from home for more than a few days must rely upon a neighbor or a friend to add water to the pool. The benefits acquired by the use of a device to automatically maintain a constant pool level is a well-known need in the pool industry. There are several devices available to the pool owner. Some are meant for industrial use indoors and do not operate well in swimming pools due to wind and wave action. Those meant for use in swimming pools are expensive and must be installed while the pool is being built. Of those intended for use over the top of the pool deck most are expensive, bulky and marginally portable requiring that ballast water be drained out or that heavy sand bag ballasts be moved. Furthermore, few devices indicate when the desired water is achieved or indicate when the device is operating and few shut off automatically when removed from the pool to prevent swimmers from tripping over the supply hose. In addition, background art gives little consideration to the electrolytic effect of supply water moving past the valve outlet aperture and causing electrolysis resulting in pool equipment metal erosion and plaster discoloration.

Many attempts to overcome the water-level maintenance problem have been developed using ball valves, flapper valves, ball cock (toilet) valves, check valves, diaphragm valves etc. requiring lever arms, linkages, fulcrum points and precise (true) pivot points to serve as valve actuators. For example, U.S. Pat. No. 4,853,986 discloses a valve within an elastomeric nozzle having a rod protruding through the valve seat in the exit portion of the nozzle, so that bending the nozzle bends the rod to tilt a generally disc shaped washer on the valve seat to allow water to flow there through. The valve seat is an elastomeric element and, the valve washer is a one-piece metallic (non-elastic) element. The conical portions of the valve seat and washer bias together to form a true (precise) pivot point as apposed to a floating pivot, toggle-type valve. Consequently, bending the nozzle, washer and rod requires substantial torquing moments and downward ballast forces to unseat the valve against a water supply pressure. As a result, the device requires clamps, cement nails or screws to counteract against the resultant forces mentioned above. The device uses plastic jar-type float having air and ballast water contained by a lid with an eyelet in its center for attaching a cord to pull downward on the nozzle thus turning the valve on to add make-up water. As the device approaches its shut-off point, its make-up water slowly trickles down the cord and through the eyelet in the cap thus letting the water displace the air in the float and causing the float to become even heavier. Consequently, the device adds more water to the pool, changes the water level, and overfills the pool, especially when rainwater or swimmer splashes enter the eyelet in the cap on the jar. Further, the device is sensitive to rapid up and down and rocking motions due to pool water surface waves being directly coupled to water in the jar causing possible damage to plumbing. Background art is replete with true pivot points in attempts to reduce noisy and harmful chatter or "waterhammer" (i.e. rapid valve opening and closure) caused by minor fluctuations in pool water surface waves. Hence, the typical need for water baffles and plural chambers as U.S. Pat. No. 4,342,125 discusses in the Abstract; illustrates on FIG. 2; describes in the Description, and claims in dependant claim 5 (Claim of No. 3). Further, U.S. Pat. No. 4,592,098 and U.S. Pat. No. 5,655,232 have float valves operated with multiple (3) true pivot points as well as complex linkages. Additionally, each one utilizes water baffles and multi-chambered structures surrounding the float to prevent valve chatter or waterhammer as previously discussed. Also, the materials used for such structures are generally buoyant and thus require substantial cantilevers or tie-down fasteners to hold the devices near a pool deck. Further, placement next to the deck inevitably interferes with the wall climbing features of automatic pool cleaners. Like U.S. Pat. No. 4,853,986 (mentioned above), U.S. Pat. No. 4,796,650 is particularly sensitive to pool water surface wave motions because water ballast within the sealed float chamber is free to rapidly slosh back and forth within the chamber. U.S. Pat. No. 5,203,038 has the true pivot point valve movement and the same sensitivity to surface wave motions because the float is non-articulated, (i.e. ridgely coupled) to the pool water surface.

SUMMARY OF INVENTION

It is an object of the invention to provide a device and method for automatically adding water to a swimming pool and the like when the water level has dropped below a desire level. It is yet another object to provide such a device with an anti-siphoning method for preventing pool water from siphoning into the water supply. It is further an object of the invention to provide a device without the need for fastening to pool structures while providing the device having low cost, low installation requirement and low maintenance. Another object is to provide a portable device that can be used with a standard garden hose and hose spigot for a water source. It is an object to limit turbulent water flow noise in the device at its operating position within the pool. Further, it is an object of the invention to provide a visible tell-tail for indicating an operating status in the device in its operating mode within the pool. Another object is to provide a adjustable water level gage for insuring a desired water level is being maintained by the device. It is yet another object of the invention to provide a device that is easily installed and adjusted to a desired water level at pool side.

The water level control device of the present invention comprises a toggle valve housing having a tubular chamber defined by inlet and outlet end walls. The end walls each have an aperture for fluid communication through the chamber. The valve housing inlet end is dimensioned for communicating with a fluid source conduit for delivering fluid under pressure through an apertured flow reducer and into the chamber. A valve washer is freely positioned for movement with in the chamber. The valve washer has a first position wherein fluid pressure from fluid passing into the chamber through the flow reducer aperture biases the valve washer against the outlet aperture, the valve washer forming a seal against the outlet aperture for preventing fluid from passing through the outlet aperture. The valve washer has a second position wherein the valve washer is tilted a distance away from the outlet aperture, unseated, sufficiently providing fluid flow through the chamber from fluid under pressure entering the inlet aperture, flowing past the valve washer and through the outlet aperture for filling a reservoir in fluid communication with a fluid source through the toggle valve. In addition, the valve washer has a third position wherein the valve washer is biased against the inlet aperture in response to a reverse fluid flow into the chamber through the outlet aperture toward the inlet aperture. The valve washer biases (seats) against the inlet aperture for preventing reverse flow (siphoning) through the valve chamber into the fluid source. Means for tilting the valve washer from its first position to its second position provides an opposing bias to the valve washer sufficient to overcome the fluid source pressure bias holding the valve washer in the first position. The displacing means is responsive to a fluid level below a desired level thus permitting fluid to flow from the communicating fluid source through the toggle valve to a reservoir having the fluid level.

In the preferred embodiment, the displacing means comprises a rod holder having a threaded insert first end and a hollow cavity second end, the rod holder first end having the valve washer fastened to the threaded insert, the flat portion of the valve washer being tiltable away from the outlet aperture in response to a downward movement of the rod holder, the outermost flat portion of the valve washer thereby functioning as a lever arm pivotal about the outlet aperture serving as a fulcrum, the rod holder dimensioned for passing through the outlet aperture for tilting the valve washer, the rod holder further dimensioned for detachably retaining a float rod first end within the hollow cavity second end for tilting the rod holder and thus the valve washer fastened to the rod holder first end, the float rod second end pivotally connected to a float for tilting the float rod, the rod holder, and the valve washer in response to lowering of the float thus permitting water flow through the outlet aperture for raising the pool level, the float rod, and the rod holder tilting the valve washer against the aperture in response to a raising float thus stopping water flow into the pool while the float is buoyed at a desired level.

Further, in the preferred embodiment for portable use comprises an outrigger assembly for maintaining float movement within a generally vertical direction and initially holding the float at a desired level within the pool. The outrigger assembly has a generally vertical tubular portion having a length positioning the float for buoying the float at the desired pool water level. The outrigger assembly further has a horizontal tubular portion for placement on a pool deck adjacent to the pool. The horizontal portion has one end adapted for fluid communication with a garden hose and forms an angled gooseneck curve with the vertical outrigger portion at a second end. The outrigger assembly further has an angular elbow extending from the vertical portion second end for holding the toggle valve assembly in a horizontal position and henceforth the float for movement in a generally vertical direction during operation.

BRIEF DESCRIPTION OF DRAWINGS

A preferred embodiment of the invention as well as alternate embodiments is described by way of example with reference to the accompanying drawings in which:

FIG. 1 is a top plan view of a water level control device of the preferred embodiment;

FIG. 2 is a partial sided elevation view of the embodiment of FIG. 1;

FIG. 3 is a partial cross-section view of float and valve housing portions of an embodiment of the present invention;

FIG. 4 is a partial cross-section view of a valve washer of the present invention illustrating anti-siphoning position for the right cylinder portion seated against an apertured inlet flow reducer within the valve housing cavity;

FIG. 5 is a cross-section view of the preferred embodiment of FIG. 3 through plane designated as V-V;

FIG. 6 is a partial end view of the valve housing inlet aperture end of the embodiment of FIG. 3 illustrating the cross-section of FIG. 6 through plane designated as III-III;

FIG. 7 is a partial end view of the valve housing outlet aperture and float rod connector end of the embodiment of FIG. 3;

FIG. 9 is a partial side elevation view of the embodiment of FIG. 1 illustrating alignment of the water supply pipe vertical portion; and FIG. 10 is a plan view of zinc ballasts illustrating proportions of ballasts on the cut-a-way view of the embodiment of FIG. 1.

DETAILED DESCRIPTION OF PREFERRED EMBODIMENT

Figure 8A:
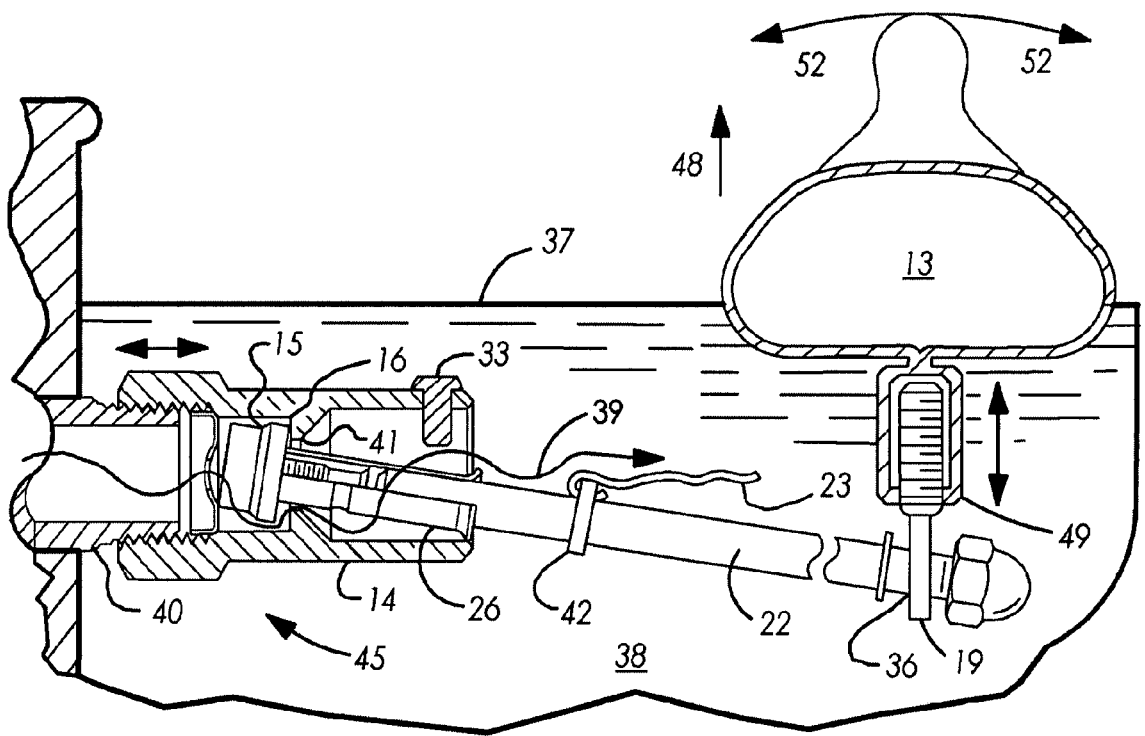
FIG. 8a-8b is a partial cross-section view of an alternate installation of the present invention illustrating valve washer second and first position respectively on the embodiment of FIG. 1.

The preferred embodiment of the present invention is a water level control device 12 comprising a valve housing 14, a detachable float rod 22, a rod holder 26, a float 13, and a tell-tail assembly 23, as illustrated with reference to FIG. 2. The valve housing 14, serves as a support for a hose attachment connection pipe 46, a ballast 17, and an outrigger assembly 18, again as illustrated with reference to FIG. 1, FIG. 2 and to FIG. 9. The valve housing assembly 14 serves as a support for a hose attachment connection pipe 46, a ballast 17 and an outrigger assembly 18 again as illustrated with reference to FIG. 1. and FIG. 2. The valve housing assembly 14 serves to house an apertured flow reducer 21, a valve washer 15, a rod holder elevation stop 33 and a rod holder assembly 26 as illustrated with reference to FIG. 3. The float rod assembly first end 34 inserts into the rod holder assembly second end 55 for operation with the float assembly 13 and the rod holder assembly 26. The float rod second end 53 passes through an oversize hole 36 in a float connector 19 below float 13. The float connector 19 pivots (articulates) about the oversize hole 36 between a toothless retainer 35 pressed onto the float rod 22 and between a retainer nut 20 thread onto the float rod second end 53. A water keel 49 molded into float 13 receives float connector 19 via the threaded portion of the water keel 19. The float 13 screws up and down on the threaded portion of the float connector 19 for elevation adjustment 48 of float 13 relative to a desired pool water level 37. A tell-tail 23 attached to a flat washer 42 slides onto the float rod first end 34 near the rod holder second end 55. The tell-tail 23 serves to indicate water flow 43 through the valve housing 14 again as illustrated with reference to FIG. 4 and to FIG. 8a-8b. Referring to FIG. 3, the rod holder assembly first end 54 passes through a water outlet aperture 41 in the valve housing 14 until the rod holder first end 54 engages a valve washer 15 at the vertical portion of a valve seat 16. A threaded insert 24 swaged flush to and within the rod holder assembly first end 54 engages a screw 25 passed through the valve washer 15. The screw 25 screws into the threaded insert 24 to confine the valve washer 15 between the valve seat 16 and an apertured flow reducer 21. The flow reducer 21 presses into the tapered pipe thread connector end of the valve housing 14 as illustrated with reference to FIG. 3. With reference to FIG. 3 and to FIGS. 8a-8b, water pressure in the hose attachment connection pipe 46 or water supply pipe 40 causes the valve washer 15 to push against the valve seat 16 to form a water-tight seal between the valve seat 16 and the pipe thread connector end of the valve housing 14, thus holding the valve washer 15 in a valve washer first position 44. A rod holder elevation stop 33 pressed into the valve housing 14 near the rod holder second end 55 serves to maintain the water-tight seal of the valve washer 15 against the valve seat 16 in case rainfall raises a pool water level 37. When water level 37 in the pool 38 is lowered, the float 13, the float rod 22 and the rod holder assembly 26 will also be lowered which urges the valve washer 15 to tilt away from its first position 44 to a valve washer second position 45, thus permitting water pressure 43 from connection pipe 46 or water supply pipe 40 to push past the apertured flow reducer 21 and to push past the water outlet aperture 41 in the valve housing 14 causing flow 39 into pool 38 bringing the pool water level 37 to its desired level. At such time, the float 13 rises with pool water level 37 and causes the valve washer 15 to tilt back to its first position 44, thus stopping flow 39 past the water outlet aperture 41 and past the apertured flow reducer 21 as illustrated with reference to FIG. 3. and FIG. 8a-8b. A water level gage "o-ring" 32 supported by a hose attachment connection pipe vertically inclined portion 47 slips over a street elbow 31 supporting the valve housing 14. The "o-ring" 32 is slid up or down the inclined portion 47 of the connection pipe 46 to indicate a desired pool water level 37 for the elevation adjustment 48 of the float 13 once the desired pool water level 37 has been achieved.

Again as illustrated with reference to FIG. 1, FIG. 10 and to FIG. 2, a preferred embodiment of the present invention comprises hose attachment connection pipe 46 outrigger 18, ballast 17, and airtight float 13. The float assembly comprises an airtight float portion buoyed proximate the water level and the water keel lower portion 49 affixed to the airtight float portion for movement with the float, the water keel lower portion having a water flooded cavity for providing rotational damping and lateral damping of float movements in response to perturbations resulting from wind plying upon the float portion and from the pool water surface waves, wherein the keel lower portion comprises a thin-walled angular box channel forming a chamber with open ends, the thin wall box dimensioned in width, length, depth, and openings for permitting free flow of pool water into the ballast portion chamber within the water keel portion. Convenience and cost dictated the use of a decoy duck with water keel 49 as float 13 for receiving float connector 19 and elevation adjustment 48 elements permitting smooth articulated movement 52 of float 13 unaffected wave motion at the pool level 37.

As described again with reference to FIGS. 1 and 2, the device 12 comprises the pipe assembly 46 for positioning the valve housing assembly 14 and thus the float 13 at the pool water 37 desired for proper pool operation. The pipe assembly 16 further holds the valve housing 14 in a submerged location below the pool water level 37. In the preferred embodiment, the pipe assembly 46 comprises a tubular portion 47 inclined vertically from a street elbow 31 connecting the float 13 and the valve housing assembly 14 at a level for buoying the float 13 at the desired pool water level 13 as illustrated with reference to FIG. 2. The vertical portion 47 further has a tubular gooseneck portion 50 to accommodate a coped deck in its transition to a horizontal tubular pipe portion 30 for placement on a pool deck 29 adjacent the pool 38. The horizontal pipe portion 30 has one end adapted for connection with a garden hose (not shown) as a water source 28. The horizontal portion of the gooseneck forms an angle with the vertical portion 47. As illustrated again with reference to FIGS. 1 and 2, the pipe assembly 46 further has an outrigger 18 extending lateral to the horizontal portions of the gooseneck 50 and the pipe 30 respectively for holding the inclined vertical portion 47 within a vertical plane and thus the street elbow 31 and the valve housing assembly 14 within a horizontal plane. In the preferred embodiment, the tubular pipe 30 and the outrigger 18 house a zinc ballast 17 pressed into the tubular pipe 30 and pressed into each outrigger. The outriggers as well as the horizontal 30 and inclined vertical 47 portions of the pipe assembly 46 continuously have water from the water source 28 therein. Such provides sufficient weight in combination with the ballasts 17 to stabilize the device 12 without affixing any portion of the device 12 to the pool structure. Further, as illustrated with reference to FIGS. 1 and 2, the water in the pipe assembly 46 flowing from the water source 28 is forced continuously past the zinc ballasts 17 within the pipe 30 and within the outriggers during operation of the device 12. Such a condition provides anti-electrolysis action in the water entering a pool 38 thereby stopping metal erosion a plaster discoloration in a pool 38. With reference to FIGS. 3 and 4, a right cylinder portion 27 of the valve washer 15 as shown in cross-section for clarity. The cylinder portion 27 of the washer 15 having a cavity in its center portion is retained between the head of the screw 25 and a threaded inserted 24. The flat portion 27 of the valve washer 15 forms a water tight seal when biased against the valve washer 15 by the compressive force of the screw 25 threaded into the threaded insert 24 at the rod holder assembly first end 54. The flat surface of the cylinder portion 27 opposite to the flat surface of the washer 15 extends slightly beyond the head of the screw 25. With reference to FIG. 4, a valve washer third position 51 having the cylinder portion 27 biasing against the flow reducer 21 results from a reverse water flow 56 from the pool 38 through the water outlet aperture 41. Such a condition is caused from siphoning from the pool 38 toward the water supply source 28 within the connection pipe 46 or the conduit line 40. The valve washer third position 51 permits the flat portion of the portion of right cylinder 27 to seat against the flat portion of the flow reducer 21 in response to the reverse water flow 50 from the pool 38 thus prevents siphoning from the pool 38 to the water source 28, an object of the present invention.

With reference to FIG. 3, the float rod 22 has the second end 53 pivotally attached to the water keel 49 of the float 13 using the float connector 19 as described earlier. The float rod 22 first end 34 slips into the rod holder assembly second end 55 against the force of water pressure 43 upon the valve washer 15 using light friction and suction forces within the rod holder 26 for detachable retention of float rod 22.

Such a condition permits easy detachment of float rod 22 and float assembly 13 from the rod holder when swimmers are present. Further, the force of water pressure 43 directed upon the conical portion of the valve washer 15 causes washer 15 to immediately center itself over the water outlet aperture 41 and to bias a small annulus portion of the valve washer 15 against the valve seat 16 within valve housing 14 thus stopping water flow 39 through the water outlet aperture 41. Such a condition holds the valve washer 15, the rod holder 26, the rod 22, the tell-tail and the float assembly 13 in the valve washer first position 44. Further, such a condition stops water flow 39 when the rod 22 and float assembly 13 is detached from the rod holder assembly 26, an object of the present invention. As illustrated with reference to FIG. 8a, the preferred embodiment incorporates a 38-to-1 mechanical advantage between the float assembly rod connection 19 at the pivoting portion of oversized hole 36 and the small annulus portion of the valve washer 15 serving as a fulcrum portion about the valve seat 16. Such a mechanical advantage provides for smooth operation of the valve washer 15 in response to vertical movement 48 caused by the float 13 buoyed by the water in the pool 38 in response to changes in the washer second position 45 thus freely moving valve washer 15 to add water to pool water level 37 as earlier described.

Figure 8B:
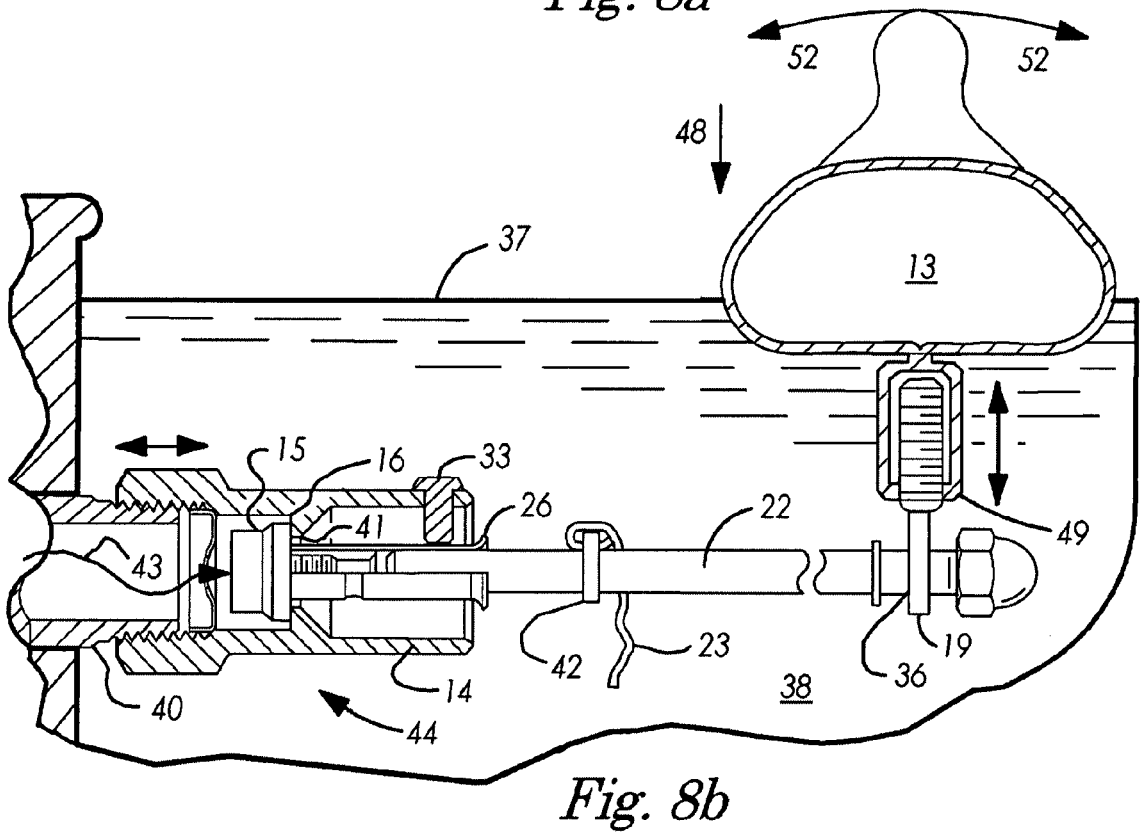

As illustrated with reference to FIGS. 8a and to 8b, the water level control device as described is adaptable for use in permanent installations. One such installation includes a dedicated water supply pipe 40 in fluid communication with the pool 38 through the water supply pipe 40 for providing control of the pool water level 37 within the valve housing 14 as earlier described.

What is claimed is:

1. A fluid flow control device comprising:
a valve housing having an inlet flow reducer aperture, valve element, and an outlet aperture having fluid communication between a valve element chamber and the inlet aperture and the outlet aperture;
a valve washer positioned within the valve housing being moveable between an inlet closed position and an outlet closed position, the washer being moveable to the outlet closed position in response to a reverse fluid flow from the outlet aperture toward the inlet flow reducer aperture, the washer moveable to the outlet closed position responsive to forward fluid flow through the inlet flow reducer aperture toward the outlet aperture;
the valve washer attached to a rod holder proximate end, the valve washer and the rod holder dimensioned for movement within the valve housing through the outlet aperture, the valve washer and the rod holder, further having a length dimension for displacing the washer away from contact with the outlet aperture,
a float rod detachably connected to the rod holder distal end; and
a float pivotally connected to the float rod proximate end by a threaded float connector, the float responsive to level changes within a reservoir wherein a fluid level below a desired level causes the float to lower thereby lowering the rod holder thus tilting the valve washer away from the outlet aperture;
a generally open water keel attached below the float for providing an up or down float adjustment by means of the threaded float connector threaded into the water keel said adjustment achieved by clock-wise or counter-clock-wise rotation of the body of the float according to the desired fluid level; and
a fluid-absorbing tell-tail attached to a flat washer slid onto the float rod distal end proximate the rod holder for indicating fluid flow or fluid closure movement of the fluid within the valve housing through the outlet aperture.

2. The device as recited in claim 1, wherein the valve housing is further defined by a cylindrical inside valve wall surface and flat end wall surfaces, and wherein the valve washer has a flat shape for providing sealing contact with the flow reducer inlet flat end and outlet flat end apertures, thus providing anti-siphon action.

3. A fluid level control device comprising:
an inlet pipe for communicating with a fluid supply, the inlet pipe having a proximal end adapted for fluid communication with the fluid supply and a distal end dimension for closed position responsive to a forward fluid flow from a flow reducer inlet aperture toward an outlet aperture;
a generally tubular rod holder having a threaded insert swaged flush into a float rod holder proximate end for receiving a threaded fastener screw to attach a valve washer thereto said valve washer thus being captivated between the flow reducer inlet and the outlet aperture, the float rod holder distal end having an opening for receiving a float rod, the float rod holder further having a length dimension sufficient for tilting the valve washer away from contact with the outlet aperture for permitting fluid flow through the outlet aperture;
an articulated float pivotally connected to the float rod distal end, the float buoyed at a fluid surface level, the float responsive to fluid level changes within a reservoir wherein a level below a desired level causes the float to lower thereby lowering the float rod distal end thus tilting the valve washer attached to the rod holder proximate end for permitting fluid flow through the outlet aperture into the reservoir.

4. The device as recited in claim 3, wherein the inlet pipe comprises a horizontal portion for positioning on a deck surface proximate the reservoir, the horizontal portion having the proximal end adapted for connection with a garden style hose, the horizontal portion having a tubular shaped zinc ballast pressed therein, the horizontal portion having lateral stabilizing members for holding a vertical portion within a generally vertical plane, the lateral members further having the tubular ballast pressed into each horizontal portion, and the vertical portion having a length dimension for placing the fluid level control device within a reservoir at a depth within the fluid for operation in monitoring a desired water level.

5. A water level control device for maintaining a constant a water level in a swimming pool, the device comprising:
a float assembly having a substantially open water keel attached to a water keel lower portion having a threaded hole dimensioned for receiving a threaded float connector, a connector lower portion having an enlarged hole for receiving a float rod thereby permitting free articulated movement of a float while limiting pool water surface wave effects on a water level within the pool;
the float having the threaded float connector threaded vertically into the lower water keel portion of the float for raising or lowering the height and depth of the float portion to a desired water level, thereby permitting adjustments of the pool water level by rotating the float horizontally about the float connector, the float further having a location proximate an edge of a pool deck for permitting manual rotational adjustments of the float thus changing elevation settings of the float, the water keel lower portion having sufficient length and depth dimensions to resist changes in the elevation settings of the float portion caused by float movements in response to perturbations resulting from pool water surface waves or from wind effects acting upon the surfaces of the float, the water keel lower portion submerged below the pool water surface level providing substantial resistant to rotational movements;

a toggle valve housing connected adjacent to the float, the valve housing having a cylindrical inside wall adapted at one end for fluid communication with a water supply through an outlet aperture and at a second end adapted for receiving an apertured flow reducer forming an inlet aperture, the flow reducer further having side walls dimensioned for insertion and removal of the flow reducer thereby, permitting insertion of a valve washer and rod holder valve assembly through the outlet aperture, the valve housing further having a stop pin extending into the cylindrical inside wall near the outlet aperture proximate the rod holder, the stop pin having a length dimension for stopping upward movement of the rod holder, thereby stopping fluid flow from the valve assembly and through the outlet aperture caused by an addition of rainwater into a pool thus preventing an increase in the pool water level beyond a desired level;

a water supply pipe adapted at one end for fluid communication with a water supply and at a second end adapted for connection with the toggle valve housing, the housing supporting a valve washer, rod holder valve assembly, the supply pipe second end in fluid communication with the outlet aperture within the valve housing;

the water supply pipe having a horizontal portion and vertical portion forming a gooseneck style curvature, the curvature dimensioned to provide clearance between an upwardly slopping portion of a coped deck and a horizontal portion of the coped pool deck, thereby permitting the horizontal portion of the water supply pipe to be positioned upon the horizontal portion of a the coped pool deck without interference from the coping, the vertical portion entering the pool having a moveable "o-ring" serving as water level gage, the "o-ring" dimensioned for gripping the outer circumference of the water supply pipe, thereby allowing up or down adjustment of the o-ring to indicate a desired pool water surface level;

the toggle valve housing having a hollow valve body, and a valve chamber connected in fluid communication between the inlet and outlet apertures, the valve housing further having the valve washer positioned within the valve chamber and being moveable between an inlet closed and an outlet closed position, the valve washer being moveable to the inlet closed position in response to a reverse fluid flow from the outlet aperture toward the inlet aperture, the valve washer moveable to the outlet closed position responsive to a forward fluid flow from the inlet aperture toward the outlet aperture; and a rod holder having a threaded insert first end and a hollow cavity second end, the rod holder first end having the valve washer fastened to the threaded insert, the flat portion of the valve washer being tiltable away from the outlet aperture in response to a downward movement of the rod holder, an outermost flat portion of the valve washer thereby functioning as a lever arm pivotal about the outlet aperture serving as a fulcrum, the rod holder dimensioned for passing through the outlet aperture for tilting the valve washer, the rod holder further dimensioned for detachably retaining a float rod first end within the hollow cavity second end for tilting the rod holder and thus the valve washer fastened to the rod holder first end, the float rod second end pivotally connected to the float for tilting the float rod, the rod holder, and the valve washer in response to lowering of the float thus permitting water flow through the outlet aperture for raising the pool level, the float rod, and the rod holder tilting the valve washer against the aperture in response to the raising float thus stopping water flow into the pool while the float is buoyed at the desired level.

6. The device as recited in claim 5, wherein the float assembly comprises an airtight float portion buoyed proximate the water level and the water keel lower portion affixed to the airtight float portion for movement with the float, the water keel lower portion having a water flooded cavity for providing rotational damping and lateral damping of float movements in response to perturbations resulting from wind plying upon the float portion and from the pool water surface waves.

7. The device recited in claim 6, wherein the keel lower portion comprises a thin-walled angular box channel forming a chamber with open ends, the thin wall box dimensioned in width, length, depth, and openings for permitting free flow of pool water into the ballast portion chamber within the water keel portion.

8. The device recited in claim 5, wherein the supply pipe comprises a pipe assembly having a tubular vertical portion having a length dimension for positioning the float assembly at a level for buoying the float at the desired pool water level, the vertical portion further having an adjustable "o-ring" for indicating a desired pool water level the horizontal portion further having one end adapted for fluid communication with a garden hose, the horizontal portion forming an angle with the vertical portion at a second end, the pipe assembly further having a tubular outrigger extending from the horizontal portion, the outrigger and the horizontal portion near the garden hose connection having hollow zinc ballasts installed therein for ballast and for stopping metal erosion and plaster discoloration due to electrolysis effected by water flow into the pool, the outrigger for holding the vertical portion and thus the float assembly in a generally vertical position.

9. The device recited in claim 5, wherein the toggle valve housing further comprises an angular street elbow having one end adapted for fluid communication with the supply pipe vertical portion for horizontally positioning the valve housing at a second end adapted for fluid communication with the supply water, the street elbow positioning the valve housing below the desired water level for limiting noise caused by water flow.

10. The device as recited in claim 5, wherein the toggle valve chamber has a flat end surface for operation with the valve washer.

11. A water level control device for maintaining a constant water level in a swimming pool comprising:

a tubular toggle valve housing for supporting a valved hose attachment connection;

a float assembly having an air tight float portion affixed atop a flooded water keel ballast portion, the water keel ballast portion positioned below the air tight float portion for resisting float assembly rotation resulting from pool water surface wave motion and surface wind motions below and above the pool water level, the water keel dimensioned for receiving a threaded float connector for providing an articulated connection between a float rod and the water keel, the float assembly dimensioned for vertical adjustment by manually rotating the float circularly about the treaded float connector;

a toggle valve positioned horizontally within the tubular valve housing, the toggle valve housing having horizontally separated vertical valve seats, each seat positioned at an inlet portion and an outlet portion of the valve housing for receiving a washer for free movement between the seats, the valve washer urged against the outlet valve seat by water pressure from a water supply in fluid communication with the hose attachment, the washer moveable to the flow reducer inlet valve seat in response to reverse water flow from the pool thus preventing water flow into the water supply; and a rod holder having a first end dimensioned for passing through an aperture of the outlet valve seat, the rod holder first end further having the valve washer attached thereto for biasing the valve washer against the outlet valve seat, and a second end having a hollow tubular portion dimensioned for detachably retaining the float rod first end, the float rod second end dimensioned for passing through an enlarged hole in the float connector for articulating the float rod about the enlarged hole between a toothless retainer pressed into the rod second end and a retainer nut threaded onto the rod second end, the float connector threaded into the float assembly lowering with the float when the pool water level is lowered, thus lowering the float rod first end and the rod holder first end, thereby tilting the valve washer attached thereto away from the outlet valve seat thus permitting water from the water supply to flow into the pool for raising the pool water level, the pool water level raising to a desired level wherein the float rises thus raising the float connector threaded thereinto, thus raising the float rod first end and the rod holder first end, thereby tilting the attached valve washer toward the outlet valve seat thus stopping flow from the water supply into the pool.

12. The device as recited in claim 11, further comprising an airtight float assembly having an apparent shape resembling an aquatic water fowl or a reptile or a flower floating on the surface water of a pool for permitting a life-like float portion substitute for a man-made float portion.

13. The device recited in claim 12, wherein a float vertical position is adjustable from a float first position selected for one desired level control to alternate positions for a different desired level control position.

* * * * *